United States Patent Office 3,582,403
Patented June 1, 1971

3,582,403
PROCESS FOR PREPARING ELECTRODES SUITABLE FOR ALKALINE STORAGE BATTERIES
John T. Owen, deceased, late of Bloomfield, N.J.; by Elizabeth Owen, executrix, 23 Emerson Terrace, Bloomfield, N.J. 07003
Continuation of abandoned application Ser. No. 629,329, Apr. 7, 1967. This application Jan. 6, 1970, Ser. No. 510
Int. Cl. H01m 35/18, 43/04
U.S. Cl. 136—24                          5 Claims

ABSTRACT OF THE DISCLOSURE

This disclosure describes electrodes for use in secondary battery sources and improvements in the process for making the same. It particularly relates to the preparation of nickel and cadmium electrodes. A porous plaque is impregnated with a solution of the desired metal ion and the metal ion is reacted in situ with an anion which forms a water-insoluble, heat-decomposable salt. The salt is then thermally decomposed to form the metal oxide. The disclosure also relates to the removal of nitrate ion in a porous metal substrate by reducing the nitrate with an enediol compound.

---

This application is a continuation of my copending application Ser. No. 629,329, filed Apr. 7, 1967, now abandoned.

This invention relates to electrodes and more particularly to positive electrodes suitable for nickel-cadmium, nickel-iron and nickel-zinc alkaline storage batteries and to the method for preparing the same. A further particular objective is to produce negative (cadmium) electrodes.

Electrodes containing electrolytically active material in the form of a metal oxide or hydroxide have considerable commercial potential. In particular, they have found use in secondary power sources of the alkaline electrolyte type, notably nickel-cadmium, nickel-zinc and nickel-iron alkaline storage batteries.

Electrodes for such batteries typically comprise a porous plaque, the pores of which contain an electrolytically active oxide or hydroxide of the desired metal, e.g. nickel or cadmium. Techniques heretofore known and practiced for preparing such electrodes have certain shortcomings which have severely limited the areas of use of alkaline batteries. In particular, the preparation of the electrodes is unduly time-consuming and expensive, and the cost of the finished battery is proportionately increased.

One widely and commercially used method of producing positive electrodes containing nickel hydroxide entails preparing a nickel plaque or matrix and loading an array of such plaques or matrices into a container with a nearly saturated solution of nickel nitrate. Thereafter, the loaded plaques are activated by electrolyzing them in a strong solution of sodium or potassium hydroxide. The resulting plaques are washed to remove entrained nitrate. Nitrate ion adversely affects the performance of the electrode and substantially complete removal thereof is essential to the long useful life of the battery. However, the nickel hydroxide formed during electrolysis is a flocculent, gelatinous precipitate which entrains considerable quantities of water and nitrate ion. In order to remove a sufficient amount of nitrate ion prolonged washing, up to 4 hours or more per cycle of impregnation, must be employed. Since it is necessary to repeat the impregnation, electrolysis and washing steps several times to obtain a satisfactory quantity of active material in the electrode, the total process consumes an inordinately long period of time and could be justified only because the batteries produced have unique properties which justify their cost in certain limited areas.

Another method involves impregnating a porous sintered nickel plaque with nickel hydroxide. The plaques are immersed in a molten bath of hydrous nickelous nitrate and the resulting plaque roasted at an elevated temperature to decompose the nickel nitrate into a product intermediate between a nickel nitrate and nickel hydroxide. The resulting plaque is immersed in hot concentrated potassium hydroxide solution to convert the intermediate product into nickel hydroxide. The plaque is then washed and dried.

The electrodes produced from either of these processes are found wanting in that reproducibility and flexiblity is not attained. Furthermore, it is common for these electrodes to produce a reasonably uniform current until they reach a voltage of about 1.1 volts, after which they exhibit a very sharp drop-off. The sharp drop-off means that the device powered by the battery comes to an abrupt halt with little or no prior warning. The present commercial electrodes are also harmed by an overcharge and cannot, therefore, be repeatedly given a "quick charge" without imparing their useful life. Slow charging is undesirable because it decreases the time that the battery is in active use.

In accordance with this invention, electrodes are produced in which reproducibility in ampere-hour capacity and desired malleability is attained. They can also be "quick-charged" without harm and are highly tolerant of an overcharge. In addition, the process for producing such positive electrodes is comparatively simple, economical of time and inexpensive. In many cases, useful electrodes can be prepared in accordance with this invention with only one impregation step as compared with the multiple impregations required by prior art processes.

The process of this invention for preparing electrodes comprises the steps of impregnating a porous conducting matrix with an aqueous solution of a water-soluble salt of an electrolytically active metal thereby forming an impregnated matrix; contacting said impregnated matrix with an aqueous solution of an anion which forms with said metal a water-insoluble salt containing oxygen in amount sufficient to form the oxide of said metal upon thermal decomposition, thereby forming a matrix containing the water-insoluble salt of said metal and said anion; and thermally decomposing said water-insoluble salt.

The matrices or plaques which are employed in the practice of this invention are any of the porous bodies which have been used in the fabrication of electrodes. They may, for example, be porous carbon or graphite blocks, blocks of sintered metal powder, metal screens or grids, wire cloth, metallized asbestos or ceramic plates, etc. Sintered metal powder blocks are generally preferred and sintered nickel plaques prepared from fine nickel powder derived from the thermal decomposition of nickel carbonyl are particularly preferred. The degree of porosity, size of poes and overall size of the plaque will vary according to the desired end use of the electrode.

In the practice of this invention, the porous plaque is impregnated with an aqueous solution of a salt of the desired metal. The metal can be any metal which has an electrolytically active form, but nickel and cadmium are presently considered to be the preferred choices. Examples of suitable salts include nickel nitrate, nickel acetate, nickel bromate, nickel bromide, nickel chloride, nickel perchlorate, nickel iodide, nickel sulfate, cadmium acetate, cadmium bromate, cadmium bromide, cadmium chlorate, cadmium iodide, cadmium nitrate, etc. In general, it is preferred to employ the nitrate salt of the metal because it is readily available and has a high order of solubility. Thus, the most preferred metal salts are nickel nitrate and cadmium nitrate.

Since the object in impregnating the porous plaque is to get as much active material as possible into the porous matrix, the aqueous solution will preferably be at or close to saturation by the metal salt. The use of elevated temperatures is advantageous in increasing the solubility of the metal salt. In some cases it is desirable to use a hydrated salt which dissolves in its own water of hydration, such salts being exemplified by nickel nitrate hexahydrate. As a practical guide, the metal salt employed should have sufficient solubility to give a concentration of at least about 25 grams of metal ion per liter of solution. There is essentially no upper limit to the concentration of the metal ion except that imposed by the solubility of the salt employed under the conditions employed.

Any suitable impregnation means can be employed to load the porous plaque with the metal salt solution. Vacuum impregnation is especially advantageous in maximizing the amount of solution loaded into the plaque in the minimum time.

After impregnation with the metal salt solution, the loaded plaque is permitted to drain and the unsorbed portion of the solution of the metal salt is removed. The unimpregnated plaque is then contacted with an aqueous solution of an anion which forms, with the metal of the metal salt, a water-insoluble compound containing oxygen in amount sufficient to give the oxide of the metal on thermal decomposition. The type of anion contemplated in the practice of the invention will be readily understood from a consideration of the following discussion, using examples of specific preferred materials. As previously noted, the preferred metal salt employed in the impregnation of the porous plaque is a highly soluble nickel salt such as nickel nitrate. The most preferred anion employed in the subsequent treatment is the carbonate ion. Thus, there is formed in the interstices of the matrix an insoluble carbonate of nickel. In its simplest sense, the reaction involved may be represented as:

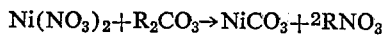

$$Ni(NO_3)_2 + R_2CO_3 \rightarrow NiCO_3 + 2RNO_3$$

wherein R is a cation which forms both a soluble carbonate and a soluble nitrate salt. The nickel carbonate formed may be thermally decomposed as follows:

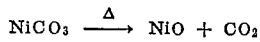

$$NiCO_3 \xrightarrow{\Delta} NiO + CO_2$$

Thus, nickel carbonate contains sufficient oxygen in the compound, itself, so that no external oxygen source is required in the decomposition reaction. It will be appreciated that the reaction equations used for illustrative purposes are probably more simplified than will be observed in practice. Most probably, the insoluble compound actually formed will be a mixture of carbonates and basic carbonates. Nevertheless, the compounds in this mixture will contain sufficient oxygen to produce nickel oxide on thermal decomposition.

Other anions which can be employed in the invention include sulfite, bicarbonate, etc. It will be understood that the choice of the anion will depend to a large extent upon the particular metal salt employed, it being necessary to produce a water-insoluble compound of said metal. By "water-insoluble," it is intended to mean a compound having a solubility less than about 1 gram per liter. It is also especially desirable that the insoluble compound produced be crystalline rather than gelatinous in nature to minimize the amount of entrained water and undesirable ions contained therein. The carbonate anion is most highly preferred since it meets the above criteria, and also produces a non-toxic and non-corrosive decomposition product, viz. carbon dioxide.

The anion will be employed in aqueous solution and will, therefore, be employed in the form of a water-soluble salt. The alkali metal salts are generally preferred because of their availability and comparatively high solubility. Typically, the solution employed will contain from about 0.5 to about 5 moles per liter or more of the anion and preferably about 1 to 3 moles per liter.

The impregnated plaque is most readily contacted with the treating solution by immersion, although equivalent techniques are also applicable. Where the plaque has been impregnated under vacuum, it is generally desirable to maintain the vacuum during this subsequent treatment. Contact between the impregnated plaque and the treating solution should be maintained for a sufficient period of time to ensure that substantially all of the metal ion will be insolubilized. Typically, this will occure in about 5 to 30 minutes, depending upon the size of the plaque, the degree of porosity, etc. Elevated temperatures of the order of 100 to 200° F. are helpful during the reaction.

The plaque is then separated from the treating solution and allowed to drain and desiccated to vacuum dryness while maintaining the temperature in the vacuum chamber. In preferred embodiments of the invention, a large portion of the anion of the original metal salt, e.g. nitrate ion, will be carried off at this point because of the non-retentive nature of the insoluble compound formed. This is especially advantageous in that it greatly reduces the aftertreatment required to remove the undesirable ions.

It is, however, a further feature of the invention to provide a technique for removing nitrate ion chemically by reaction with an enediol compound, i.e. a water-soluble, organic compound containing the

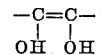

$$\begin{array}{c} -C=C- \\ | \phantom{=} | \\ OH \phantom{=} OH \end{array}$$

group. The remaining valences of the enediol group may be satisfied by any non-reactive groups which do not destroy water solubility. For this reason, it is preferred that the enediol compound contain less than about eight carbon atoms. Examples of such compounds include ascorbic acid, dihydroxymaleic anhydride, reductone, etc. With the aid of the reducing agent containing an enediol group, for example, ascorbic acid or one of its homologues or the sodium salt thereof, and a moderate temperature, the nitrate rapidaly decomposes, releasing nitrogenous groups which are carried off in gaseous phase. It is believed that the reaction takes place in accordance with the following equation:

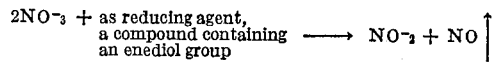

$$2NO^-_3 + \begin{array}{c}\text{as reducing agent,}\\ \text{a compound containing}\\ \text{an enediol group}\end{array} \longrightarrow NO^-_2 + NO \uparrow$$

The amount of enediol compound employed will generally be not greater than the amount of nitrate ion originally impregnated into the plate. Since the nitrate ion is readily leached out, it will be found in practice that a considerably smaller amount, of the order of 10% of the amount of nitrate originally impregnated, will often suffice. This novel method for removing nitrate ion is especially suitable for use with the plaques hereinbefore described, but is also useful with prior art plaques, provided additional quantities of enediol compound are employed to handle the larger quantity of nitrate retained. The reduction of nitrate in this fashion substantially eliminates the need for prolonged washing of the plaque.

After the formation of the insoluble metal compound (and reduction of nitrate ion, if employed), the plaque is dried and then baked to decompose the insoluble compound to the metal oxide or a hydrated form thereof. The temperature and duration of baking will vary somewhat according to the nature of the particular insoluble compound. For the preferred insoluble carbonate of nickel, temperatures of the order of 600 to 750° F. and preferably 650 to 700° F., an times of the order of 10 to 60 minutes and preferably 15 to 30 minutes are suitable. For cadmium, the preferred range is 850–875° F. The atmosphere in which the baking is conducted is not critical, except that reducing atmospheres (e.g. ammonia) are to be avoided in the preparation of nickel oxide-containing electrodes since it is desired to maintain the nickel in as high a valence state as possible. Reducing atmospheres may, however, be used in other cases such as with cadmium oxide-containing electrodes.

In order to build up the desired quantity of active material in the plaque, a series of impregnations, treatments and making steps may be employed. It is also possible to perform a sequence of impregnation and treatment steps followed by a single baking step. Whatever sequence is employed, it is generally not contemplated that more than about four impregnations will be required.

Another unexpected advantage of this invention is that the electrode obtained after baking contains metal oxide in an electrolytically active state, e.g. the trivalent state for nickel. The amount of trivalent nickel obtained immediately after baking may be increased by using a trivalent nickel compound in the impregnation step or by employing an oxidizing atmosphere during baking or a combination of these variations.

In general, however, it will be most convenient to activate the nickel oxide electrolytically in an alkaline electrolyte by connecting it to the positive pole of a suitable direct current source. Activation will normally be accomplished at a voltage of at least about 1.4 volts and a current density of at least about 0.1 ampere per square inch of electrode surface. Typical working ranges for electrolytic activation are voltages of about 1.4 to about 5 volts and current densities of about 0.1 to about 2 amperes per square inch. Preferably the voltage will be about 1.75 to 4.5 volts and the current density will be about 0.15 to 1 ampere per square inch. Electrolysis will be continued for a time sufficient to allow conversion of substantially all of the nickel oxide to the active state, typically about 1 to 15 hours. The precise times employed will depend upon the voltage and current density used. It has been observed that thicker electrodes, of the order of 0.050 inch or greater, are most suitably activated by electrolyzing at the lower end of the voltage and current density ranges for a longer period of time. The electrolysis can be carried out after the complete cell is assembled or prior thereto. While the foregoing discussion has made specific reference to nickel oxide electrodes, it will be understood that other electrodes prepared according to the invention may be similarly activated with appropriate changes in the conditions. For example, cadmium electrodes would be activated by electrically connecting them to the negative pole of a direct current source under suitable conditions.

After activation, the electrodes and the cell prepared therefrom will be in a fully charged condition. The cell can then be repeatedly discharged, either slowly or rapidly and then recharged, either slowly or rapidly. Recharging is generally carried out at a voltage between about 1.0 and 3.0 volts and a current density of about 10 to 100 amperes per square foot of electrode surface. Current is passed until the electrodes are fully charged, typically in about 7 to 14 hours.

The following examples are given to illustrate practice of specific embodiments of the invention.

EXAMPLE 1

Five sintered nickel plates having the dimensions 1¾ x 2⅛ x 0.066 inches, a porosity of 82–84% and a total weight of 29 grams are placed in a large sealed jar, and the jar is evacuated to a pressure of 35 mm. Hg. An aqueous solution of nickel nitrate, saturated at room temperature, is preheated to 180° F. and 500 cc. thereof is admitted to the jar, fully submerging the plates. The system is maintained at 180° F. and 35 mm. pressure for 20 minutes, after which the solution is drained from the jar without breaking the vacuum.

There is then introduced into the jar, without changing the pressure, 450 cc. of an aqueous potassium carbonate solution (400 g./l.) and 50 cc. of an aqueous ascorbic acid solution (100 g./l.), so that the plates are again fully immersed. This system is allowed to stand under vacuum at about 180° F. for 20 minutes, after which the solution is drained off and the jar is vented to the atmosphere. The plates are removed, allowed to drain, and rinsed briefly with demineralized water, then dried at 80° C. for 20 minutes.

The plates are baked for 20 minutes at 650–700° F. and allowed to cool. They are then weighed again and it is found that the five plates show a total increase of 10.3 grams over their original weight.

EXAMPLE 2

The procedure of Example 1 is repeated using four sintered nickel plates and a saturated solution of cadmium nitrate in place of the saturated nickel nitrate. The plates are baked at 850–875° F. for 20 minutes. The total weight gain for all four plates is 11.8 grams.

EXAMPLE 3

The nickel electrodes of Example 1 and the cadmium electrodes of Example 2 are assembled in a polyethylene container with paper separations. A 30% aqueous potassium hydroxide solution is added as the electrolyte and the cell is charged at 1.84 volts and 3 amperes for 100 minutes. The charging conditions are then changed to 2 volts and 2.75 amperes and the cell is allowed to charge for fourteen hours, during which time the voltage drops to 1.75 volts and the current increases to 4 amperes.

The charged cell is discharged at a current of 0.35 ampere for 3 hours. A total of 1.2 ampere-hours is obtained before the observed voltage drops below 1.0 volt. This is equivalent to 0.03 ampere-hour per gram of nickel electrode, a figure which is a significant improvement in power density. It is also noted that the voltage obtained throughout the greatest part of the discharge cycle is a very satisfactory 1.18 volts.

The cell is then recycled twice by charging at 1.4 volts for 14 hours and discharging at a high rate. Both the recharging and quick discharge are found to be highly satisfactory. It is a particular feature of this invention that the performance described above is achieved with only a single impregnation step. Present commercial practice requires a number of impregnations to obtain such results. The efficiency of the instant process is at least in part attributable to the fact that the in situ formation of an insoluble salt minimizes loss of active material throughout wash-out.

EXAMPLE 4

A cell is prepared in a manner similar to that of Example 3 except that there are employed three nickel electrodes of 0.1 inch thickness and two cadmium electrodes of 0.106 inch thickness. This cell is subjected to two cycles of a 14-hour charge followed by discharge at about 0.35 ampere per hour. It is then given a severe overcharge at 4 volts and a current of 17 amperes for one hour. The charged cell gives an open-circuit voltage of 1.42 volts and a discharge cycle similar to that of Example 3. A total of 0.96 ampere-hour is obtained before voltage drop-off occurs. This is equivalent to 0.022 ampere-hour per gram of nickel electrode. Thus, the electrodes of this invention are capable of normal performance after a high overcharge.

What is claimed is:

1. The process for preparing electrode consisting essentially of the steps of impregnating a porous conducting matrix with an aqueous solution of a water-soluble salt of an electrolytically active metal thereby forming an impregnated matrix; contacting said impregnated matrix with an aqueous solution of an anion which forms with said metal a water-insoluble salt containing oxygen in amount sufficient to form the oxide of said metal upon thermal decomposition, thereby forming a matrix containing the water-insoluble salt of said metal and said anion; thermally decomposing said water-insoluble salt and electrically activating said electrode by electrolyzing in an alkaline electrolyte.

2. The process of claim 1 wherein said electrolytically active metal is selected from the group consisting of nickel and cadmium.

3. The process of claim 1 wherein said anion is selected from the group consisting of sulfite, carbonate and bicarbonate anion.

4. The process of claim 3 wherein said electrolytically active metal is selected from the group consisting of nickel and cadmium and said anion is a carbonate anion.

5. The process of claim 1 wherein said porous conducting matrix is a sintered nickel plaque.

References Cited

UNITED STATES PATENTS

| | | | |
|---|---|---|---|
| 2,847,332 | 8/1958 | Ramadanoff | 136—169X |
| 2,162,385 | 6/1939 | Langguth | 136—28X |
| 2,831,044 | 4/1958 | Bourgault et al. | 136—29 |
| 2,880,257 | 3/1959 | Murphy et al. | 136—29 |
| 2,952,570 | 9/1960 | Heunickx | 136—24X |
| 3,041,388 | 6/1962 | Fukuda et al. | 136—24 |
| 3,068,310 | 12/1962 | Casey et al. | 136—24 |
| 3,274,028 | 9/1966 | Okinaka et al. | 136—29 |
| 3,284,237 | 11/1966 | Lambert et al. | 136—67X |

WINSTON A. DOUGLAS, Primary Examiner

A. SKAPARS, Assistant Examiner

U.S. Cl. X.R.

136—29, 75